INVENTOR
E.R. KRETZMER
BY Lucien E. Canepa
ATTORNEY

Jan. 27, 1970 E. R. KRETZMER 3,492,642

MULTISTAGE ERROR CONTROL ENCODER AND BAFFER ARRANGEMENT

Filed April 15, 1966 4 Sheets-Sheet 2

Jan. 27, 1970 E. R. KRETZMER 3,492,642

MULTISTAGE ERROR CONTROL ENCODER AND BAFFER ARRANGEMENT

Filed April 15, 1966 4 Sheets-Sheet 4

3,492,642
MULTISTAGE ERROR CONTROL ENCODER AND BUFFER ARRANGEMENT

Ernest R. Kretzmer, Holmdel, N.J., assignor to Bell Telephone Laboratories, Incorporated, New York, N.Y., a corporation of New York Filed Apr. 15, 1966, Ser. No. 542,944
Int. Cl. G08b *29/00;* G08c *25/00;* H01f *27/34*
U.S. Cl. 340—146.1 13 Claims

ABSTRACT OF THE DISCLOSURE

A unitary $(n+k)$-stage serial memory includes $k$ stages of encoding circuitry and $n$ stages of buffer register. $k$ information elements from the $k$-stage circuit are shifted into the $n$-stage buffer section while being simultaneously applied to a feedback circuit and a communication channel. The feedback circuit produces $(n-k)$ checks elements which are sequentially applied to the input of the $k$-stage circuit.

This invention relates to the selective coding of data signals and more particularly to systems for coding such signals in accordance with error control formats.

It is characteristic of many data processing systems of practical importance that they embody therein an error control capability. This capability may be either of the error detection and retransmission type or of the so-called forward-acting type. In the first-named type a determination is made in a receiving terminal of the system as to whether or not a received code signal sequence is error-free. If it is error-free, the sequence is delivered to an associated utilization circuit. If, on the other hand, the sequence is found to contain errors, a retransmission-request signal is sent by the receiving terminal to the transmitting facility from which the sequence originated. In a forward-acting error control system, automatic correction of erroneously-received sequences is carried out in the receiving terminal before the sequences are delivered to a utilization circuit.

Both types of error control systems require buffer registers as component parts thereof. In the error detection and retransmission type of system, a register is required in the transmitting terminal to store a transmitted code sequence for possible retransmission. In addition, in both types of systems, a register is required in the receiving terminal to store a received sequence until a determination is made by decoding circuitry as to the error condition of the sequence.

As heretofore constructed, the buffer registers required in a typical error control system constitute relatively expensive units whose modes of operation impose difficult control requirements on the system. As a consequence, much effort has recently been directed at attempting to decrease the cost of such registers and to simplify the interaction between the registers and other components included in the system.

An object of the present invention is to provide improved data processing systems. More specifically, an object of this invention is to provide improved data processing systems of the error control type.

Another object of the present invention is to simplify the buffer register units in error control systems.

Still another object of this invention is to provide compact, inexpensive and reliable buffer registers for use in error control systems.

Yet another object of the present invention is to simplify the interaction between the buffer registers and the coding circuitry of an error control system.

Briefly stated, these and other objects of the present invention are realized in two specific illustrative data processing system embodiments thereof each of which comprises a serial memory of the domain-wall type. A memory of this type includes a propagation medium, such as, for example, a square-loop magnetic wire, in which successive unique regions may be established or nucleated by means of a nucleating coil coupled to the wire, the remainder of the medium remaining in its normal or cleared magnetic state. In this way, a binary sequence may be represented in the medium. In turn, the nucleated regions are propagated in a controlled way along the medium to an output region to which a sensing coil is coupled.

In accordance with the principles of this invention, a unique coding and buffering arrangement for a conventional $(n, k)$ cyclic code is provided. In one specific embodiment the arrangement includes a compact unitary $(n+k)$-stage serial memory. The first $k$ stages of the memory comprise a portion of the encoding circuitry of the embodiment. The remaining $n$ stages of the memory constitute the buffer register portion thereof. The $k$ digits of a data word to be encoded are respectively applied to the $k$ encoding stages of the memory. Then feedback circuitry associated with the encoding stages is activated and a shifting cycle of operation is initiated. During this cycle, the $k$ data digits are abstracted in sequence from the memory and applied to a communication channel. During the abstraction process, the data signals are recirculated via the feedback circuitry, whereby parity check digit signals are generated therefrom and applied to the input of the encoding portion of the memory. At the same time, the data signals are shifted in sequence from the encoding section of the memory into $k$ adjacent stages of the buffer register portion. The shifting of signals stored in the encoding and buffering sections takes place in unison in response to signals applied to a propagation structure that encompasses the entire memory.

At that point in the overall cycle of operation of the first-described illustrative embodiment, representations of the $k$ data signals have been applied to the channel and, in addition, preserved in the unitary serial memory. Also, at that point, $n-k$ stages of the encoding portion of the memory respectively contain therein the parity check digit signals to be appended to the corresponding $k$ data signals. These check signals are then abstracted from the memory and applied to the channel. Concurrently, the $n-k$ check signals are shifted into the buffer register portion of the memory. Hence, after applying a redundant $n$-digit data sequence to the channel, the described embodiment has stored in the $n$ buffer register stages of its serial memory a replica of the transmitted sequence. The occurrence in the embodiment of a subsequent retransmission-request signal causes the replica stored in the memory to be applied to the channel.

A second specific illustrative embodiment of the principles of the present invention includes a $(2n-k)$-stage serial memory. The first $n-k$ stages of this memory comprise the encoding portion of the embodiment, and the remaining $n$ stages thereof constitute the buffer register portion. The two portions of the memory are separated by an erasing coil which when energized prevents stored representations from propagating from the encoding portion into the buffer register portion. As in the first embodiment, a common propagating structure is coupled to the entire length of the propagation medium of the serial memory, whereby the shifting of signals stored in the encoding and buffering sections occurs in unison.

The $k$ digits of a data word to be encoded are applied to the $n-k$ encoding stages of the second embodiment.

The data digits are so applied via enabled feedback circuitry. At the same time, the $k$ data digits are applied to the channel and, in addition, are shifted in sequence around the erasing coil and into $k$ stages of the buffer register portion of the memory. Thereafter the feedback circuitry is disabled and $n-k$ parity check digit signals are applied to the channel. These check digit signals are also applied to the buffer register section of the memory. Hence at that point in the cycle of operation of the second embodiment, an $n$-digit redundant data sequence (a replica of the transmitted sequence) is stored in the buffer section of the memory, ready to be reapplied to the channel in response to a retransmission-request signal from an associated receiving terminal.

In accordance with another aspect of the principles of the present invention, the sensing coils coupled to the propagation medium of a serial memory are of a unique and advantageous type. Each such coil comprises a main output winding flanked by two oppositely-wound auxiliary windings each having one-half as many turns as the main winding. As a result, any stray flux fields that simultaneously link an entire sensing coil do not induce therein a net output voltage, whereby noise voltages arising from such fields are effectively canceled. On the other hand, output signals generated in the novel sensing coils due to signals propagated along the medium are significantly enhanced.

It is accordingly a feature of the present invention that an error control system includes a single compact unitary serial memory having distinct coding and buffering sections, and that a structure be coupled to the memory for propagating signals in unison along the two distinct sections.

It is another feature of this invention that data signals and associated parity signals generated in the encoding portion of the system be applied to a communication channel and, in addition, be shifted into the buffer section of the serial memory for preservation therein.

It is still another feature of the present invention that sensing coils coupled to the propagation medium of a serial memory each comprise a main output winding having N turns flanked by two oppositely-wound N/2-turn auxiliary windings.

A complete understanding of the present invention and of the above and other objects, features and advantages thereof may be gained from a consideration of the following detailed description of two illustrative embodiments thereof presented hereinbelow in connection with the accompanying drawing, in which.

Figure 1:
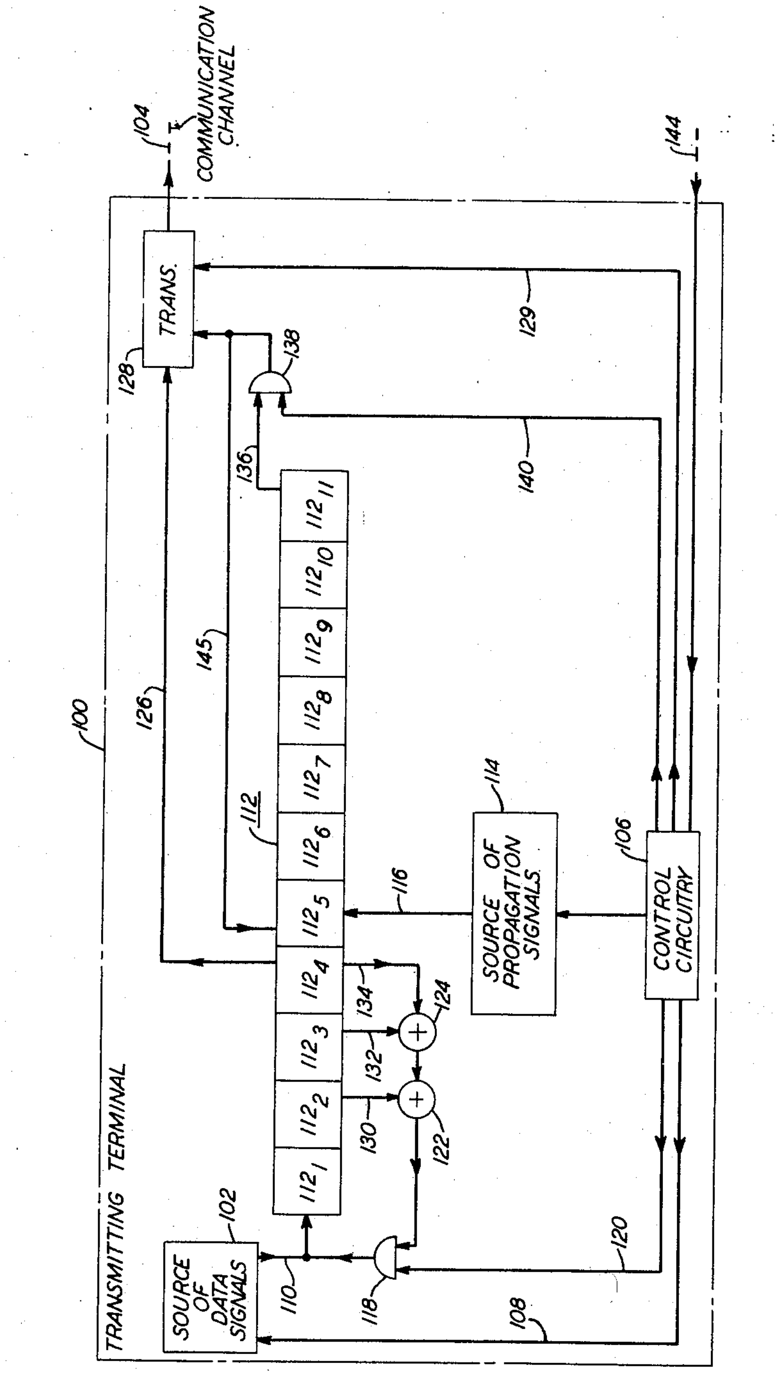
FIG. 1 shows a specific illustrative error control system made in accordance with the principles of the present invention.

Referring now to FIG. 1, there is shown an illustrative transmitting terminal 100 which includes a source 102 of $k$-digit data words that are to be encoded in the terminal 100 in accordance with an error control format and then applied in redundant form to a communication channel 104 for transmission to an associated receiving terminal (not shown). In response to signals applied thereto from control circuitry 106 via a lead 108, the source 102 serially applies a data word comprising $k$ signals over a lead 110 to the input end of a serial memory 112 whose structure and function in performing both coding and buffering operations will be described in detail later below.

For illustrative purposes, the terminal 100 of FIG. 1 is depicted as being arranged to encode data words in accordance with a (7, 4) cyclic code. In this code format, $k$ (the number of digits per data word) equals four. In response to each 4-digit data word supplied by the source 102, the encoding circuitry in the terminal 100 generates $n-k$ (or 3) associated parity check digit signals which are appended to the data word to form a 7-digit redundant sequence that is applied to the channel 104. Codes of this general type are well-known in the art, being described, for example, on pages 148–151 of "Error Correcting Codes" by W. W. Peterson, The M.I.T. Press and John Wiley & Sons, 1961. Such a code possesses error detecting and correcting properties. In other words, for certain classes of errors, the code possesses forward-acting or automatic correction capabilities. For other classes of errors, the code has embodied therein the capability to detect but not correct error occurrences.

For the particular illustrative case in which $n$ and $k$ are assumed to be seven and four, respectively, the $(n+k)$-stage serial memory 112 shown in FIG. 1 comprises eleven stages or digit positions which are designated $\mathbf{112_1}$ through $\mathbf{112_{11}}$. The left-hand four stages $\mathbf{112_1}$ through $\mathbf{112_4}$ constitute the encoding portion of the memory 112, and the right-hand seven stages $\mathbf{112_5}$ through $\mathbf{112_{11}}$ comprise the buffering section thereof. To initiate an encoding cycle of operation the source 102 is triggered by the control circuitry 106 to apply a serial 4-digit data word to the memory 112. In synchronism therewith, the circuitry 106 controls a source 114 of propagation signals to apply shifting or stepping pulses to the memory 112 via a lead 116. These propagation signals cause the applied data signals to be shifted into the memory 112 in a digit-by-digit manner, whereby the four data signals are respectively stored in the stages $\mathbf{112_1}$ through $\mathbf{112_4}$. During this shifting-in process a gate 118 is disabled by the circuitry 106 via a lead 120. In this way feedback circuitry including EXCLUSIVE-OR circuits 122 and 124 is disabled, whereby no signals derived from the stages $\mathbf{112_2}$ through $\mathbf{112_4}$ of the memory 112 are applied via the circuits 122, 124 and the gate 118 to the input stage $\mathbf{112_1}$ of the memory 112.

Connected to the encoding stage $\mathbf{112_4}$ of the memory 112 of FIG. 1 is a lead 126 which extends to a transmitter 128. Operation of the transmitter 128 is controlled by the circuitry 106 via a lead 129. Signals that are propagated between the stages $\mathbf{112_4}$ and $\mathbf{112_5}$ are also coupled to the lead 126 and thereby processed by the transmitter 128 for application to the channel 104. In a similar way output leads 130, 132 and 134 connected to the stages $\mathbf{112_2}$, $\mathbf{112_3}$ and $\mathbf{112_4}$, respectively, are effective to couple signals to the EXCLUSIVE-OR circuits 122 and 124 whenever signals are shifted out of the particular stage to which a respective output lead is connected. For example, an output signal appears on the lead 130 only during the time interval in which a signal is being shifted from the stage $\mathbf{112_2}$ into the adjacent stage $\mathbf{112_3}$.

The last or right-most stage $\mathbf{112_{11}}$ of the memory 112 has an output lead 136 connected thereto. This lead extends to a gate 138 which, under the control of signals supplied thereto by the circuitry 106 via a lead 140, applies to the transmitter 128 signals that are shifted out of the stage $\mathbf{112_{11}}$ during a retransmission mode of operation. Advantageously, such signals are also recirculated via a lead 145, to be stored again in case of one or more subsequent repeat requests.

Assume that the above-mentioned four data signals initially supplied by the source 102 to the memory 112 are designated D1 through D4, where D1 represents the first-in-time such signal. The resultant storage condition of the memory 112 is indicated in row No. 1 of FIG. 3. At that point in the cycle of operation, the circuitry 106 applies an enabling signal to the gate 118, thereby closing the feedback path that interconnects the four stages $112_1$ through $112_4$ of the encoding circuitry. Thereafter, the data representation stored in the memory 112 is shifted by the propagation source 114 one digit position to the right. As a result of this shift, two other distinct and separate operations occur. First, the data signal D1 is applied via the lead 126 to the transmitter 128 for application to the channel 104. This operation is represented in row No. 2 of FIG. 3, wherein the digit D1 is indicated as being applied to the transmitter 128. Second, the data digits D1, D2 and D3 respectively appear on the output leads 134, 132 and 130 and are processed by the EXCLUSIVE-OR circuits 122 and 124 to generate a first parity check digit signal C1. This digit is passed through the enabled gate 118 and applied to the input stage $112_1$ for storage therein. The resultant storage condition of the memory 112 is indicated in row No. 2 of FIG. 3.

Subsequently, two additional shifts of the memory 112 of FIG. 1 take place. Each of these shifts results in the application of another data digit to the transmitter 128. In addition, each shift causes the digit that is being applied to the transmitter 128 to be also propagated into the buffering section of the memory 112 for preservation therein. Lastly, each of these two additional shifts causes another parity check digit signal to be generated and applied to the input of the memory 112. Hence the storage condition of the memory 112 at that time is as represented in row No. 4 of FIG. 3. In addition, the schematic representation in row No. 4 indicates that the data digits D1, D2 and D3 have been applied to the transmitter 128.

At this point in the cycle of operation of the illustrative terminal shown in FIG. 1, all three of the parity check digits C1 through C3 associated with the data digits D1 through D4 have been generated and stored in the memory 112. Accordingly the gate 118 is then disabled by the control circuitry 106, whereby no additional signals generated by the EXCLUSIVE-OR circuits 122 and 124 are applied to the input of the memory 112. Thereafter the propagation source 114 causes four more shifts of the stored sequence to occur. The manner in which these shifts cause the stored sequence to propagate along the memory 112 is represented in rows 5 through 8 of FIG. 3. Also, FIG. 3 indicates on the right-hand side thereof the successively-longer sequence that is applied to the transmitter 128.

Figure 3:
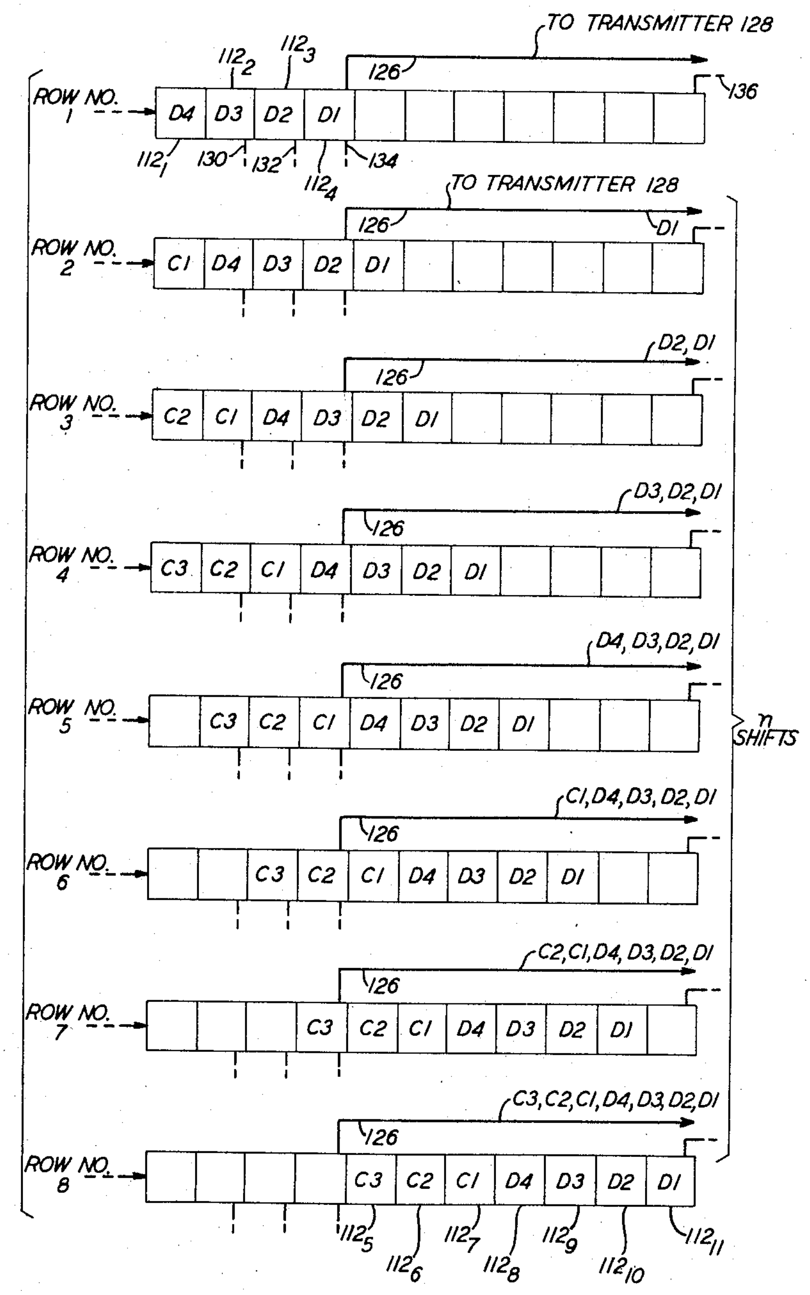
FIG. 3 is a schematic representation of the storage condition of the serial memory included in the FIG. 1 system.

In other words, FIG. 3 indicates that after a total of seven shifts (subsequent to the storage condition depicted in row No. 1) a 7-digit redundant sequence comprising four data digits and three parity check digits has been applied to the transmitter 128 for transmission over the channel 104. In addition, FIG. 3 indicates (in row No. 8) that a complete replica of that redundant sequence is stored in the buffering section (stages $112_5$ through $112_{11}$) of the memory 112.

In an associated receiving terminal (not shown) the transmitted 7-digit redundant sequence is processed in a conventional manner to ascertain the error condition thereof. Assume for purposes of illustration that the received sequence is determined to contain an error pattern that is beyond the automatic correction capabilities of the system but within the detection capabilities thereof. Furhermore, assume that a retransmission of the erroneously-received sequence is desired. To effect the retransmission, a retransmission-request signal is sent from the receiving terminal via a reverse channel 144 (FIG. 1) to the transmitting terminal 100. In turn, the control circuitry 106 responds to this signal by enabling the gate 138 and controlling the propagation source 114 to initiate a retransmission mode of operation. During this mode, the source 114 propagates the sequence shown in row No. 8 of FIG. 3 to the right in a step-by-step manner by 7-digit positions. Accordingly, the herein-considered 7-digit sequence stored in stages $112_5$ through $112_{11}$ is applied to the transmitter 128 which is controlled by the circuitry 106 to reprocess the sequence and reapply it to the channel 104. Simultaneously, the sequence is recirculated into the buffering section of the register 112 via the lead 145.

Advantageously the serial memory 112 shown in FIG. 1 comprises a domain-wall shift register arrangement. Such arrangements are well-known in the art being described, for example, in (1) K. D. Broadbent Patent 2,919,432, issued Dec. 29, 1959, (2) an article by D. H. Smith entitled "A Magnetic Shift Register Employing Controlled Domain Wall Motion," which appears in the Institute of Electrical and Electronics Engineers Transactions on Magnetics, vol. MAG–1, No. 4, pages 281–284, December 1965, and (3) R. F. Fischer application Ser. No. 538,736, filed Mar. 30, 1966 now Patent No. 3,439,352.

Figure 2A:
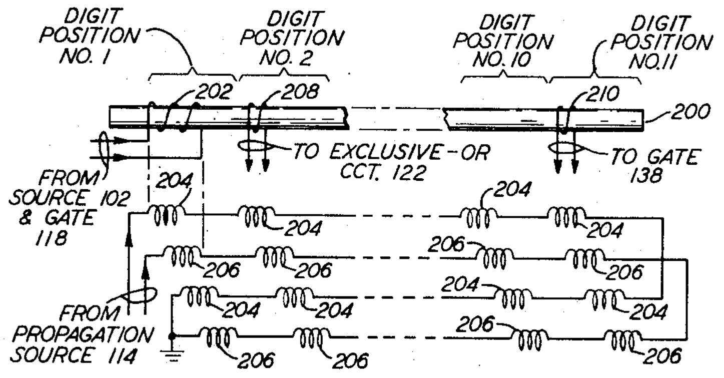
FIGS. 2A and 2B are detailed depictions of the structure of an illustrative serial memory that may be included in the system of FIG. 1.

A specific illustrative register of the domain-wall type suitable for inclusion in the FIG. 1 terminal is shown in FIG. 2A. The depicted arrangement includes a propagation medium which for exemplary purposes is assumed to be a continuous length of wire 200 made of a suitable square-loop magnetic material. (One particularly suitable material therefor is described in a copending application of D. H. Smith and E. M. Tolman, Ser. No. 458,140, filed May 24, 1964.) More generally, the medium is of a material characterized by the ability to maintain a reverse (magnetized) domain therein in response to a first magnetic field in excess of a nucleation threshold and the ability to move that domain therealong in response to a second field in excess of a propagation threshold and less than the nucleation threshold.

Coupled to the wire 200 of FIG. 2A is a nucleating or input coil 202 which receives input signals from the source 102 (FIG. 1) during the above-described data read-in operation. During subsequent portions of the cycle of operation of the illustrative system, the coil 202 has parity check digit signals applied thereto from the gate 118.

Signal representations that are established in the shift register arrangement of FIG. 2A by the nucleating coil 202 may be shifted or propagated along the medium 200 by means of a conventional array of two sets of overlapping coils 204 and 206. For purposes of clarity, the coils 204 and 206 are shown in FIG. 2A as being detached from the medium 200. In actual practice these coils are, of course, wound about and magnetically coupled to the medium 200.

As indicated in FIG. 2A, each digit position along the medium 200 may be considered to encompass four overlapping propagating coils. Only four illustrative ones of these digit positions are depicted in FIG. 2A. It is noted that the nucleating coil 202 is shown as being disposed generally coextensive with the first or left-most two propagating coils 204 and 206.

In response to signals applied thereto from the control circuitry 106 (FIG. 1) the propagation source 114 is adapted to apply four-phase propagating signals of a well-known form to the noted sets of coils 204 and 206. As a result of such signals, input representations stored in the medium 200 are shifted therealong from digit position to digit position in a step-by-step fashion.

As indicated in FIG. 1, output signals are abstracted from the stages or digit positions $112_2$ through $112_4$ and $112_{11}$ of the memory 112. Output coils 208 and 210 for accomplishing this abstraction from digit positions $112_2$ and $112_{11}$, respectively, are shown in FIG. 2A. Each of the coils 208 and 210 is wound about and magnetically coupled to the medium 200. Illustratively, the coils 208 and 210 are centrally disposed with respect to the first or left-most one of the four propagating coils associated with its respective digit position. Accordingly, each output coil has generated therein an output signal of a unique form in response to the propagation from its respective stage of the trailing or left-hand interface of the magnetic representation stored in the stage.

The stage designated $112_4$ in FIG. 1 has two output leads emanating therefrom. These leads may be considered to be representative of two distinct output coils coupled to the medium 200 (FIG. 2A). Alternatively, only a single output coil may be coupled to the stage $112_4$. In the latter case, two pairs of leads are connected in parallel to the single coil to supply output signals to the transmitter 128 and to the EXCLUSIVE-OR circuit 124.

For illustrative purposes, the initial or cleared state of the medium 200 or FIG. 2A is assumed to be the right-to-left magnetization condition thereof. In other words, the initial magnetic condition of the wire 200 can be represented by a horizontal arrow (not shown) pointing to the left. Illustratively, this magnetic condition is assumed to represent the binary "0" state. Assume then that the source 102 applies to the nucleating coil 202 a signal of the proper polarity to establish a reverse or left-to-right stable magnetic condition or domain in the wire portion coupled thereto. This reverse or unique domain is representative of a "1" signal. Thereafter, other "0" or "1" signals may be applied in serial form to the coil 202. In response to the application of a "0" signal to the coil 202 no reverse domain is established in the wire 200 associated therewith. But in response to a "1" signal, a reverse domain is created in the wire 200. In turn, these "0" and "1" signal representations are propagated in sequence along the medium 200 by signals applied to the coils 204 and 206 by the propagation source 114.

The output coils 208 and 210 coupled to the memory 112 of FIG. 1 are represented in FIG. 2A as each comprising a single multiturn coil whose individual turns are wound about the medium 200 in the same direction. Output coils of this type are of course conventional. In accordance with one aspect of the principles of the present invention, each of the output coils represented in FIGS. 1 and 2A is advantageously modified to be of a unique and improved form, as shown in detail in FIG. 2B.

Figure 2B:
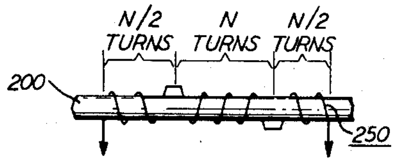

The illustrative output coil 250 depicted in FIG. 2B includes a main centrally-disposed portion having N turns wound about the wire 200 in a first or reference direction. In addition, the coil 250 includes two flanking portions respectively butting the ends of the main portion and electrically connected thereto. Each flanking portion includes N/2 turns wound about the wire 200 in opposition to the reference direction.

Stray flux fields which simultaneously link all the turns of the output coil 250 shown in FIG. 2B do not induce a net voltage therein. This is due to the fact that the stray or noise voltage generated in the main portion of the coil 250 is exactly equal and opposite in polarity to the additive voltages generated in the two flanking portions thereof. Accordingly, noise voltages arising from stray fields are effectively canceled in the novel coil 250.

Figure 2C:
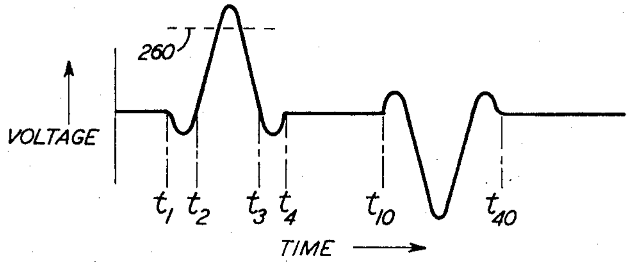
FIG. 2C shows the waveform of the voltage generated in a novel output coil included in the system.

On the other hand, a propagating magnetic domain representative of a "1" signal generates a unique and easily detectable signal in the novel output coil 250 of FIG. 2B. The voltage waveform of such an output signal is shown in FIG. 2C. The negative-going signal represented in FIG. 2C as occurring between times $t_1$ and $t_2$ arises from the left-to-right passage of the leading or right-hand interface of the propagating "1" domain through the left-hand N/2-turn flanking coil. The subsequent passage of this interface through the main portion of the coil 250 induces therein the relatively high amplitude positive-going main output signal which occurs between the times designated $t_2$ and $t_3$ in FIG. 2C. Thereafter, during the time interval between $t_3$ and $t_4$, the noted interface propagates through the right-hand N/2-turn flanking coil and generates therein a negative-going signal.

Subsequently, the trailing or left-hand interface of the above-assumed propagating "1" domain passes through the output coil 250. This causes another bipolar signal to be generated in the coil 250. However, as indicated in FIG. 2C in the time interval $t_{10}$ through $t_{40}$, this second signal is the inverse of the one previously described.

Detection of the passage of the above-assumed "1" signal through the coil 250 of FIG. 2B can be accomplished, for example, by a suitable threshold element that responds to the bipolar output signal exceeding a threshold level represented by the line 260 in FIG. 2C.

As mentioned above, the composite coil 250 shown in FIG. 2B is advantageous in that it results in cancellation of noise-induced voltages. Additionally, in contrast to conventional output coils of the type shown in FIG. 2A, the coil structure of FIG. 2B is effective to steepen the slope of the leading and trailing edges of the main output voltage generated therein. Also, the total excursions of the leading and trailing edges of the main portions of the waveforms shown in FIG. 2C are significantly greater than those characteristic of a conventional output coil, whereby detection of the output waveform is facilitated.

Figure 4:
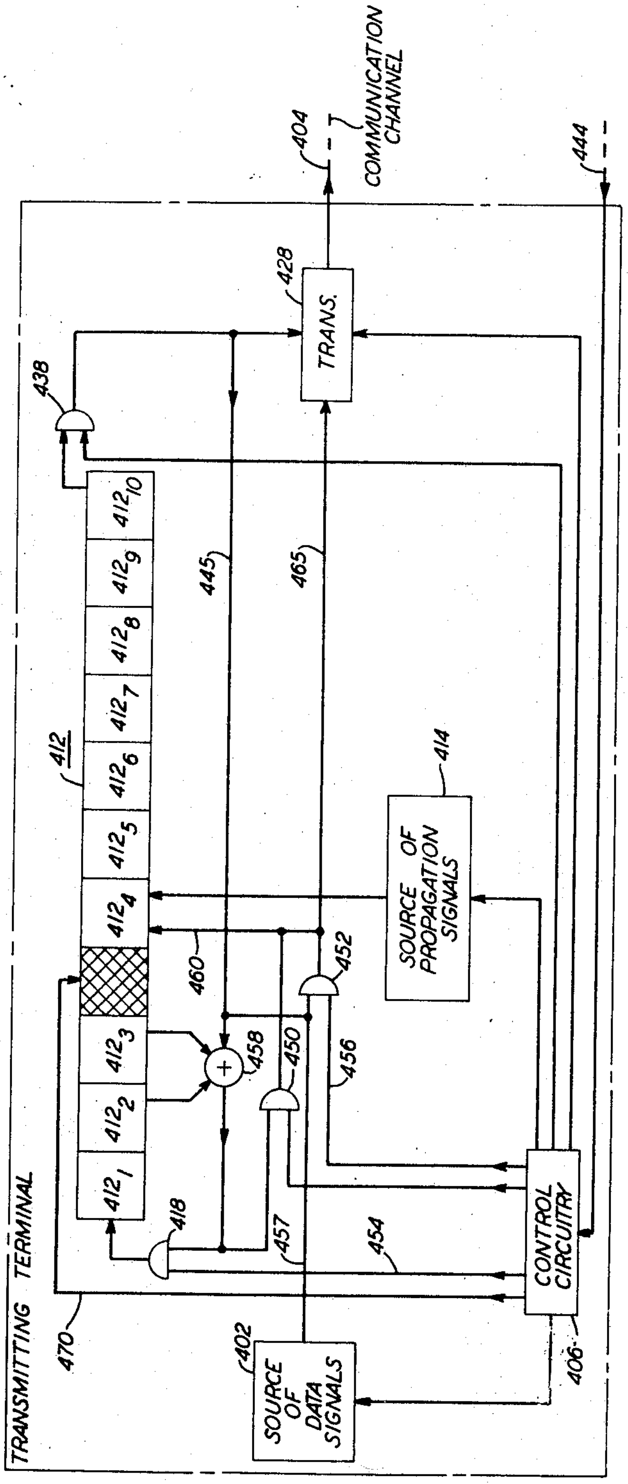
FIG. 4 shows another specific illustrative error control system which embodies the principles of the present invention.

In accordance with the principles of the present invention various other error control systems may be constructed. The transmitting terminal of one such alternative system is shown in FIG. 4. The system depicted there includes a number of component units whose structure and functional capabilities are similar to those of the corresponding units in FIG. 1. These similar units include a source 402 of data signals, control circuitry 406, a source 414 of propagation signals, a transmitter 428 and gates 418 and 438. The FIG. 4 system also includes a serial memory 412, gates 450 and 452, a forward communication channel 404 and a reverse channel 444.

Advantageously, the memory 412 shown in FIG. 4 also comprises a continuous propagation medium of the domain-wall type, as described above. The memory 412 includes $n-k$ encoding stages. For the particular (7, 4) cyclic code assumed herein, $n-k$ equals three. These three stages are designated $412_1$ through $412_3$ in FIG. 4. The memory 412 also includes $n$ (or 7) buffering stages $412_4$ through $412_{10}$. Positioned between the stages $412_3$ and $412_4$ is a so-called erase winding which is symbolically represented in FIG. 4 by a cross-hatched rectangle. The erase winding, which will be described below in connection with FIG. 5, serves to prevent signal representations from propagating from the stage $412_3$ into the stage $412_4$. In effect the erase winding divides the memory 412 into two digit shift registers having a common propagation structure coupled thereto.

The operation of the FIG. 4 terminal is as follows. With the gates 418 and 452 enabled by the control circuitry 406, via leads 454 and 456, respectively, a 4-digit data sequence is applied by the source 402 over a lead 457 to the gate 452 and to an EXCLUSIVE-OR circuit 458. In synchronism therewith the source 414 is controlled by the circuitry 406 to apply propagating signals to the memory 412. In this way the data signals are serially injected from the output of the gate 452 via a lead 460 and the stage $412_4$ into the left-hand four stages of the buffering section of the memory 412. At the same time, signals derived from the four data input signals are applied via the EXCLUSIVE-OR circuit 458 and the gate 418 to the input stage $412_1$ of the encoding section of the memory 412. Concurrently therewith the data sequence is applied via a lead 465 to the transmitter 428 for application to the channel 404. Then the gates 418 and 452 are disabled and the gate 450 is enabled. Thereafter, three additional shifts of the memory 412 are made. These shifts are effective to respectively store the four data digits in the stages $412_7$ through $412_{10}$. These three shifts are also effective to generate three parity check digit signals which are applied via the EXCLUSIVE-OR circuit 458 and the enabled gate 450 into the stages $412_4$ through $412_6$ of the buffering section. At the same time, these three parity signals are applied via the lead 465 to the transmitter 428 for application to the channel 404. In this way the three parity signals are applied to the channel 404 immediately subsequent to the application thereto of the four data signals.

At this point in the cycle of operation of the FIG. 4 terminal, a 7-digit redundant sequence has been applied to the channel 404 for transmission to an associated receiving terminal (not shown). In addition, a replica of this sequence has been stored in the stages $412_4$ through $412_{10}$ of the buffering section of the memory 412. If a subsequent retransmission-request signal is received via the reverse channel 444 and applied to the control circuitry 406, the propagation source 414 is activated and the gate 438 is enabled, whereby the stored 7-digit sequence is delivered to the transmitter 428 for reapplication to the channel 404. Advantageously, the sequence is also recirculated via a lead 445 and the gate 452 into the buffering section of the memory 412.

Figure 5:
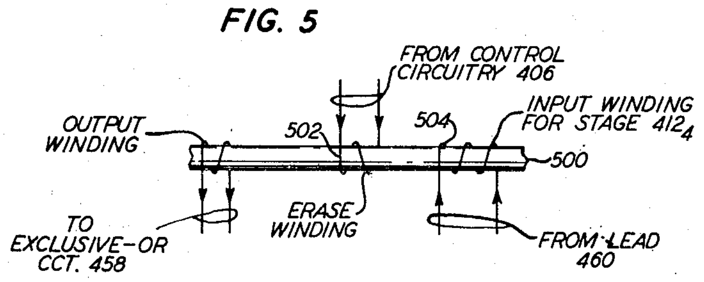
FIG. 5 illustrates in detail the structure of one particular portion of the serial memory included in the FIG. 4 system.

The action of an erase winding in dividing a domain-wall structure into a plurality of distinct shift registers is described in detail in a copending application of P. Mecklenburg and L. H. Young, Ser. No. 533,155, filed March 10, 1966. An illustrative such erase winding 502 is shown in FIG. 5. The winding 502 prevents any "1" signal representation stored in medium 500 from being propagated to the right beyond the winding 502 to induce a signal in input winding 504, which is an input winding associated with the left-most digit position or stage $412_4$ of the buffering section of the memory 412 (FIG. 4). Propagation of such "1" signals is inhibited by applying a current to the erase winding 502 to switch any "1" signal magnetized domain to the cleared or quiescent magnetic state. This inhibiting current is supplied to the winding 502 by the control circuitry 406 via a lead 470 (FIG. 4). Inhibition is controlled to occur whenever a signal is being shifted out of the stage $412_3$. In this way, partially-formed parity signals generated in the encoding section of the memory 412 during the encoding process are not prematurely coupled into the buffering section.

In summary, there have been described herein in detail two specific illustrative error control embodiments of the principles of the present invention. Each of these embodiments comprises a compact unitary serial memory having distinct encoding and buffering sections in which signal representations are propagated in unison in a simple and reliable manner.

Although the primary emphasis herein has been directed to embodying the principles of this invention in illustrative transmitting terminals, it is to be understood that serial memories of the type described herein are also well suited for inclusion in the receiving terminal of an error control system to perform decoding and storage functions therein.

Furthermore, it is to be understood that the above-described arrangements are only illustrative of the application of the principles of the present invention. In accordance with these principles numerous other arrangements may be devised by those skilled in the art without departing from the spirit and scope of this invention.

What is claimed is:

1. In combination, a continuous propagation medium comprising a coding section and a buffering section, means coupled to said medium for propagating therealong in unison signal representations stored in said sections, means for sequentially applying a data signal group to said coding section, and means coupled to said coding section and responsive to signal representations propagated therealong for generating in sequence a parity check signal group.

2. A combination as in claim 1 further including means for applying said data group and its corresponding parity check group to a communication channel and to the buffering section of said medium.

3. A combination as in claim 2 wherein said medium comprises a multistage domain-wall shift register, said combination further including means respectively coupled to said sections for abstracting signals therefrom.

4. A combination as in claim 3 wherein said abstracting means comprises a plurality of output windings each output winding including a multiturn main coil coupled to said medium in a reference sense and further including flanking coils coupled to said medium and respectively butting the ends of said main coil, each of said flanking coils having one-half as many turns as said main coil and being coupled to said medium in opposition to the reference sense.

5. A combination as in claim 4 wherein the coding section of said register includes $k$ stages, where $k$ is the number of data signals included in an applied data group, and wherein the buffering section of said register includes $n$ stages, where $n-k$ is the number of check signals included in a generated parity group.

6. A combination as in claim 4 wherein the cooding section of said register includes $n-k$ stages, where $k$ is the number of data signals included in an applied data group and $n-k$ is the number of check signals included in a generated parity group, and wherein the buffering section of said register includes $n$ stages.

7. A combination as in claim 6 further including means coupled to said medium intermediate said coding and buffering sections for preventing signal representations from being propagated along said medium from said coding section into said buffering section.

8. In combination in an error-control coder, a continuous propagation medium having first and second storage sections of unequal capacity, an input winding coupled to the section of lesser storage capacity for applying thereto sequences to be coded, a plurality of spaced apart output windings coupled to said section of lesser storage capacity, feedback means connected to said output windings for applying signals generated therein to said input winding to thereby effect coding of each of said sequences by generating a respective check digit sequence therefor, and means for applying each of said sequences to be coded and its associated check sequence into the section of greater storage capacity.

9. A combination as in claim 8 wherein each of said output windings comprises a main coil coupled to said medium in a reference sense and two flanking coils respectively connected to and butting the ends of said main coil, each of said flanking coils including one-half as many turns as said main coil and being coupled to said medium in opposition to the reference sense.

10. A combination as in claim 9 wherein said medium comprises a multistage domain-wall shift register arrangement.

11. A combination as in claim 10 wherein said first section comprises $k$ encoding stages and said second section comprises $n$ buffering stages, where $k$ is the number of digits included in a sequence to be coded and $n-k$ is the number of check digits included in a coded sequence.

12. A combination as in claim 10 wherein said first section comprises $n-k$ encoding stages and said second section comprises $n$ buffering stages, where $k$ is the number of digits included in a sequence to be coded and $n-k$ is the number of check digits included in a coded sequence.

13. A noise-cancelling output winding adapted to be coupled to a propagation medium, said winding comprising, an N-turn main coil coupled to said medium in a reference sense, two N/2-turn flanking coils electrically connected to and butting the respective ends of said main coil, each of said flanging coils being coupled to said medium in opposition to said reference sense, whereby stray flux fields that simultaneously couple all the turns of said winding induce no net noise voltage therein.

(References on following page)

References Cited

UNITED STATES PATENTS

| | | | |
|---|---|---|---|
| 3,191,054 | 6/1965 | Ghisler et al. | 340—174 X |
| 3,241,127 | 3/1966 | Snyder | 340—174 |
| 3,286,242 | 11/1966 | Gianola | 340—174 |
| 3,398,400 | 8/1968 | Rupp et al. | 340—146.1 |
| 2,703,389 | 3/1955 | Schwartz | 333—29 |

EUGENE G. BOTZ, Primary Examiner

R. STEPHEN DILDINE, Jr., Assistant Examiner

U.S. Cl. X.R.

333—12; 336—170, 181

PO-1050
(5/69)

UNITED STATES PATENT OFFICE
CERTIFICATE OF CORRECTION

Patent No. 3,492,642 Dated January 27, 1970

Inventor(s) E. R. Kretzmer

It is certified that error appears in the above-identified patent and that said Letters Patent are hereby corrected as shown below:

On the drawings, Sheets 1, 2, 3 and 4, in the title, each occurrence, the word "BAFFER" should read --BUFFER--.

SIGNED AND
SEALED
JUL 7 1970

(SEAL)
Attest:

Edward M. Fletcher, Jr.
Attesting Officer

WILLIAM E. SCHUYLER, JR.
Commissioner of Patents